United States Patent
Bennett

[11] Patent Number: 6,059,127
[45] Date of Patent: May 9, 2000

[54] KNOCK-DOWN SUPPORT FOR GAS CYLINDERS

[76] Inventor: Richard C. Bennett, 710 - 2 Diamond Lake Rd., Mundelein, Ill. 60060

[21] Appl. No.: 09/345,342

[22] Filed: Jul. 1, 1999

[51] Int. Cl.[7] ....................................................... A47F 7/00
[52] U.S. Cl. ......................................................... 211/85.18
[58] Field of Search ............................... 211/85.18, 60.1, 211/69, 70.4, 74, 85.19

[56] References Cited

U.S. PATENT DOCUMENTS

| | | |
|---|---|---|
| Re. 33,645 | 7/1991 | Coote . |
| 2,317,064 | 4/1943 | Josephian . |
| 2,404,513 | 7/1946 | McCabe . |
| 3,065,857 | 11/1962 | Sanders . |
| 3,347,572 | 10/1967 | Pfaff, Jr. et al. . |
| 3,602,368 | 8/1971 | Gould .................................. 211/85.18 |
| 3,625,370 | 12/1971 | Mintz . |
| 3,791,403 | 2/1974 | Folkerth . |
| 4,119,044 | 10/1978 | Hines . |
| 4,640,521 | 2/1987 | Berfield . |
| 4,688,685 | 8/1987 | Brace . |
| 4,715,573 | 12/1987 | Liegel . |
| 4,899,968 | 2/1990 | Eaglin et al. . |
| 5,100,007 | 3/1992 | Espasandin et al. . |
| 5,176,265 | 1/1993 | Bennett . |
| 5,190,305 | 3/1993 | Putman . |
| 5,535,898 | 7/1996 | Burgess, Sr. et al. . |

Primary Examiner—Alvin Chin-Shue
Assistant Examiner—Sarah Purol
Attorney, Agent, or Firm—Emrich & Dithmar

[57] ABSTRACT

A knock-down cart for pressurized gas cylinders has a castered base defining a platform with an aperture formed centrally therethrough. An elongated mast is formed by vertical posts spaced by cross bars and having an upper end receivable through the platform aperture from the bottom thereof, and coupling structure fixed to the lower end of the mast and dimensioned to prevent passage through the aperture and bolted to the base. A retaining frame includes two H-frames respectively U-bolted to the mast posts above the base and having their ends interconnected by end rails secured by bolts to nuts fixed to the cross members. A manifold support is U-bolted to one of the mast posts above the retaining frame, and a cover has a central aperture receiving the mast therethrough and is U-bolted to the mast posts above the manifold support.

23 Claims, 4 Drawing Sheets

KNOCK-DOWN SUPPORT FOR GAS CYLINDERS

BACKGROUND OF THE INVENTION

The present invention relates to holders or retainers for groups of pressurized gas cylinders to maintain them firmly in a predetermined array configuration.

The present invention is an improvement of the gas cylinder cart disclosed in U.S. Pat. No. 5,176,265, the disclosure of which is incorporated herein by reference. That cart has a castered base having a cylinder-supporting platform. An upstanding mast includes a pair of laterally spaced posts welded to the platform and projecting upwardly therefrom centrally thereof. A retaining frame 41 includes a grid welded to the mast and including cross members, the opposite ends of which have threaded studs affixed thereto and projecting therefrom to be received through openings in channel-shaped end rails and secured in place with nuts. A cover is welded to the upper end of mast. Cylinders are supported on the base platform and are spaced apart by the gridwork established by the retaining frame.

While this prior cart works well, it is somewhat unwieldy to transport and store when not in use because of its welded construction. Also, the arrangement of the parts is inflexible, because the retaining grid and the cover are welded to the mast in fixed locations.

SUMMARY OF THE INVENTION

It is a general object of the invention to provide an improved pressurized gas cylinder support which avoids the disadvantages of prior supports while affording additional structural and operating advantages.

An important feature of the invention is the provision of a cylinder support which is flexible in that it can be configured in various ways.

Another feature of the invention is the provision of a support of the type set forth, which can be readily disassembled and reassembled in different arrangements.

In connection with the foregoing feature, another feature of the invention is the provision of a support of the type set forth, wherein the major parts thereof are bolted together.

Certain ones of these and other features of the invention may be attained by providing a knock-down support for a plurality of pressurized gas cylinders comprising:

- a base having a platform with top and bottom sides and an aperture therethrough centrally thereof,
- an elongated mast having an upper end receivable through the aperture from the bottom side of said platform and a lower end, and
- coupling structure fixed to the lower end of the mast and dimensioned to prevent passage through the aperture and removably secured to the base.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
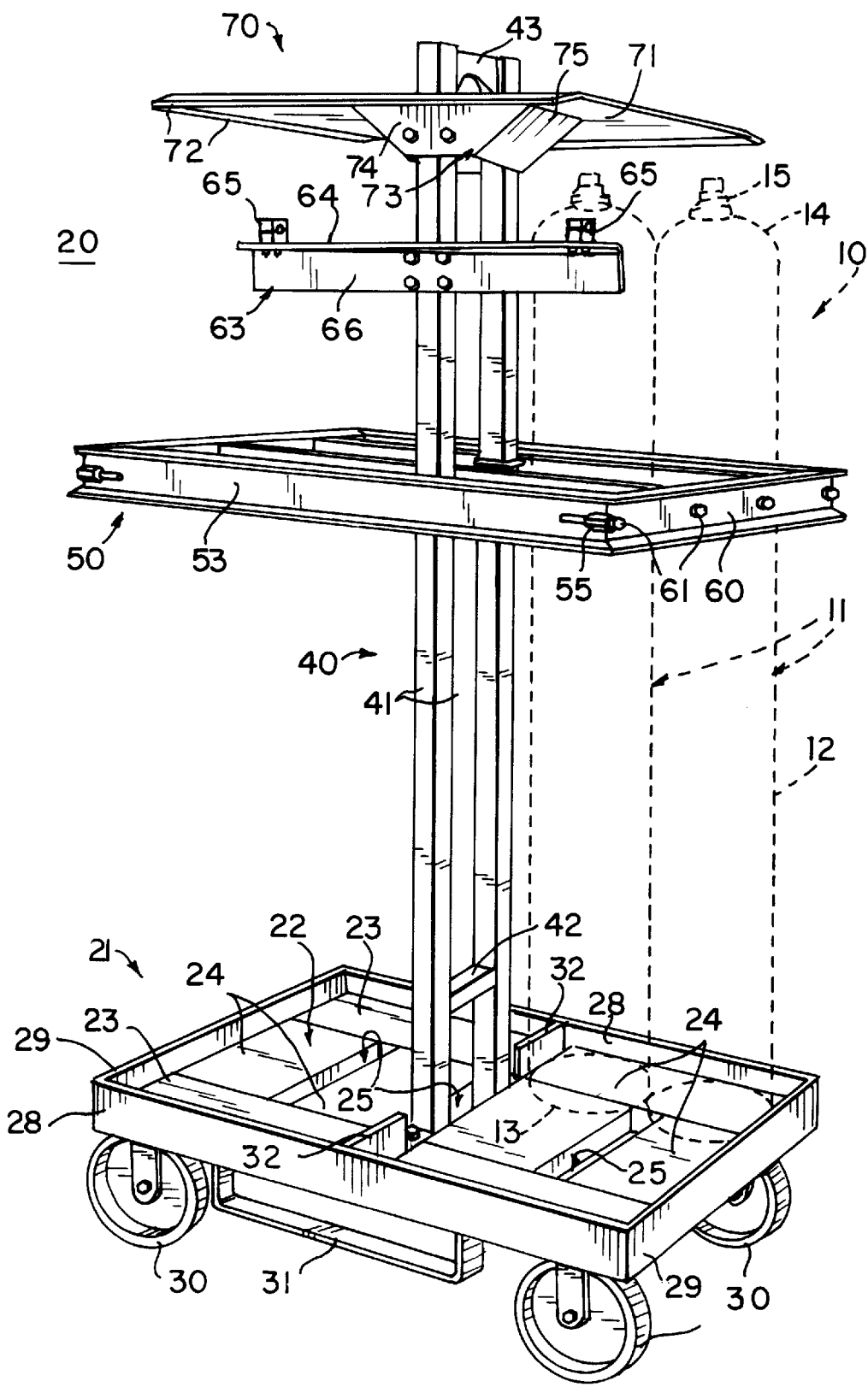
FIG. 1 is a perspective view of a gas cylinder support constructed in accordance with and embodying the features of a first embodiment of the present invention, with gas cylinder positions thereon indicated in phantom.

Referring to FIG. 1, there is illustrated in phantom an array 10 of pressurized gas cylinders 11 in a position on which they could be supported on an associated cart 20 in accordance with the present invention. Each of the cylinders 11 is of standard construction, having a cylindrical side wall 12, closed at the bottom by a substantially flat bottom wall 13 and at the upper end by a rounded, sloping top wall 14, which converges upwardly toward the longitudinal axis of the cylinder and terminates in a suitable valve structure 15. The cart 20 is designed to support an array of as many as 12 of the cylinders 11. As will be explained more fully below, the cart 20 could be made in various sizes to accommodate different numbers of cylinders.

Figure 3:
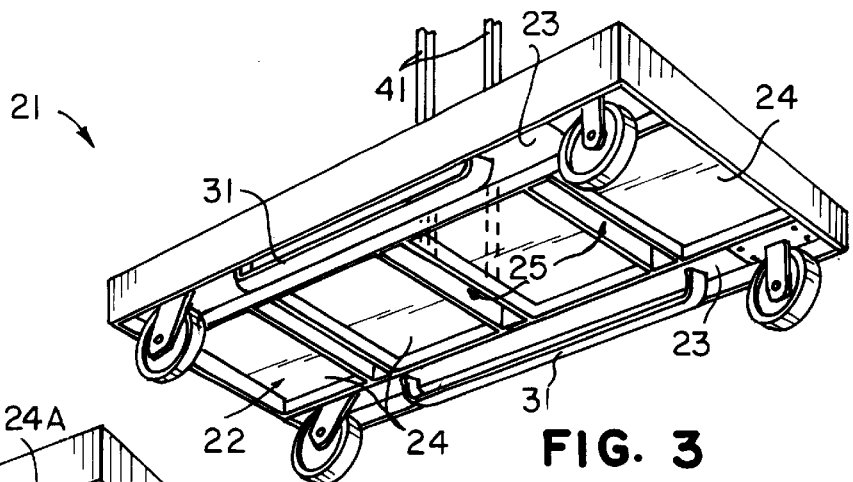
FIG. 3 is a fragmentary bottom perspective view of the base of the cart of FIG. 1.
Figure 4:
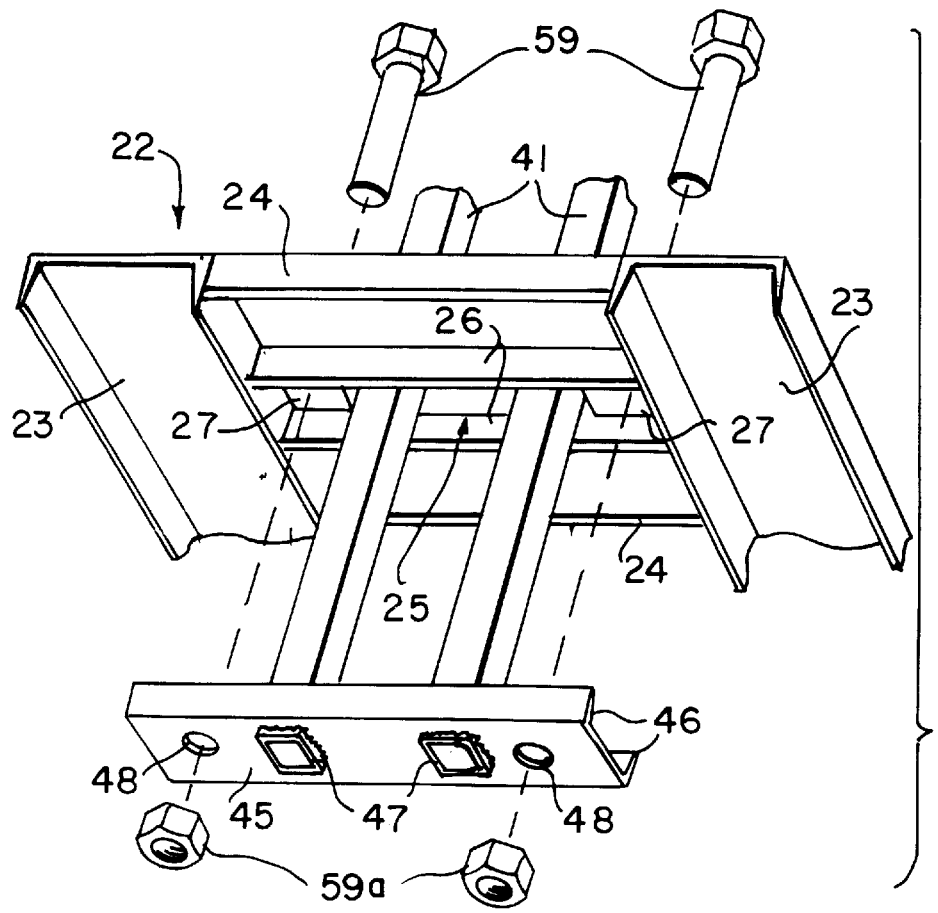
FIG. 4 is an enlarged, fragmentary, exploded, perspective view of the coupling between the base and mast of the cart of FIG. 1.

The cart 20 has a base 21 including a substantially rectangular, flat base wall or platform 22. Referring also to FIGS. 3 and 4, the platform 22 is preferably formed of a plurality of channel members with depending flanges, including a pair of elongated side channels 23 interconnected by a plurality of longitudinally spaced cross channels 24. The depending flanges 26 of the cross channels 24 cooperate to define apertures 25 between the spaced cross channels 24 and extending laterally of the base 21. Fixed in the central one of these apertures 25 at the opposite ends thereof are washers 27, which may be welded to the flanges 26 of the cross channels 24 which define the aperture 25, as can best be seen in FIG. 4.

Fixed to the platform 22 along the peripheral edges thereof are a pair of side walls 28 and a pair of end walls 29, each projecting upwardly a predetermined distance above the surface of the platform 22. Fixed to the underside of the platform 22, as at opposite ends of the side channels 23, preferably by bolts or screws (not shown) are four casters 30, two of which may be swivel casters, in a known manner. Depending from the side channels 23 adjacent to the outer side edges thereof are two generally U-shaped skid rails 31 which extend longitudinally between the front and rear sets of casters. Also fixed to the upper surface of the side channels 23 and extending laterally thereacross are a pair of side partitions 32 which cooperate with the walls 28 and 29 to divide the platform 22 into front and rear sections.

Figure 2:
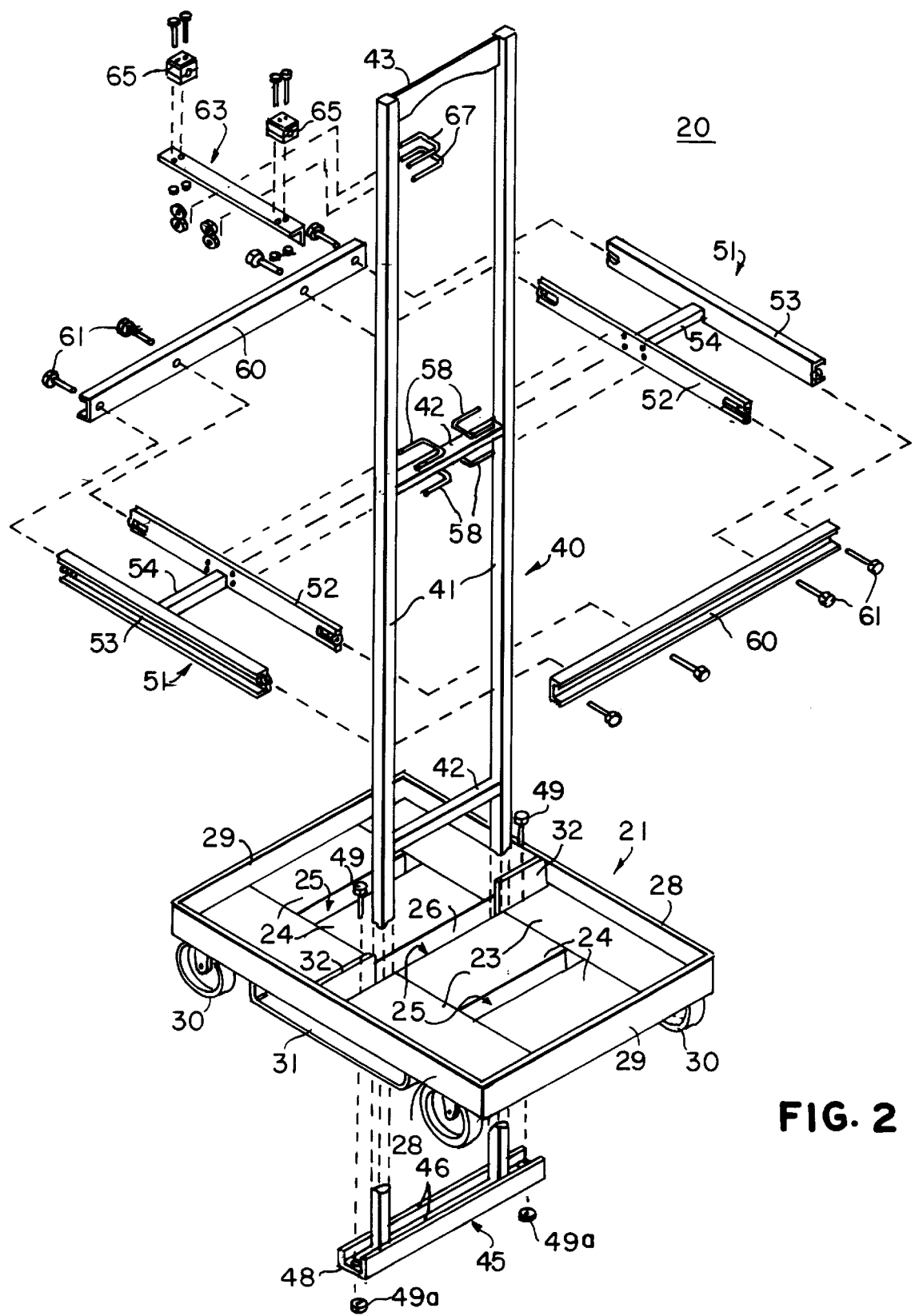
FIG. 2 is a partial, exploded, perspective view, with portions broken away, of the cart of FIG. 1.

Referring to FIGS. 2 and 4, the cart 20 includes an elongated, upstanding mast 40, which includes a pair of parallel posts 41, each preferably in the form of a box beam, the posts 41 being parallel to each other and interconnected by longitudinally spaced cross bars 42 and a top bar 43. The posts 41 are joined at their lower ends by an end channel 45. More specifically, the bottom ends of the posts 41 may be received in complementary openings in the center wall of the end channel 45 and fixed thereto as by welding (FIG. 4). The size and spacing of the posts 41 as such that the mast 40 can be received in the central aperture 25 of the base platform 22 by inserting the upper end of the mast 40 through the aperture 25 from the underside of the base 21. However, the end channel 45 is dimensioned so that it will not pass through the aperture 25. More specifically, the end channel 45 has upstanding flanges 46 which may, respectively, overlap the cross channel flanges 56 which define the aperture 25. Also, the end channel 45 has a length such that it overlaps the washers 27 and has apertures 47 formed therethrough for respectively receiving bolts 49, which are fitted through the washers 27 and the holes 48, being secured by nuts 59a, removably to fasten the mast 40 to the base 21.

Figure 6:
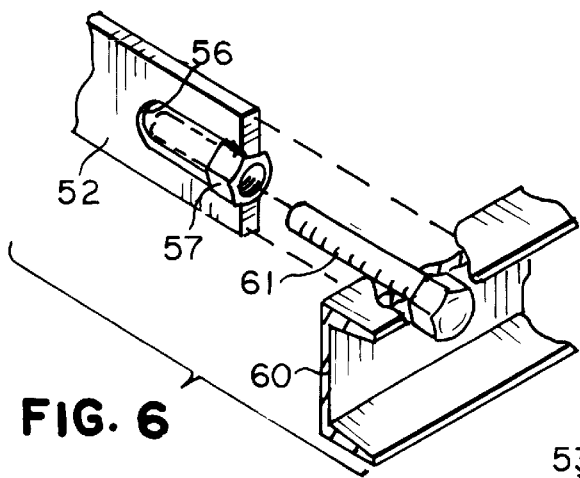
FIG. 6 is an enlarged, fragmentary, perspective view, with portions broken away, of a part of the retaining frame of the cart of FIG. 1.
Figure 7:
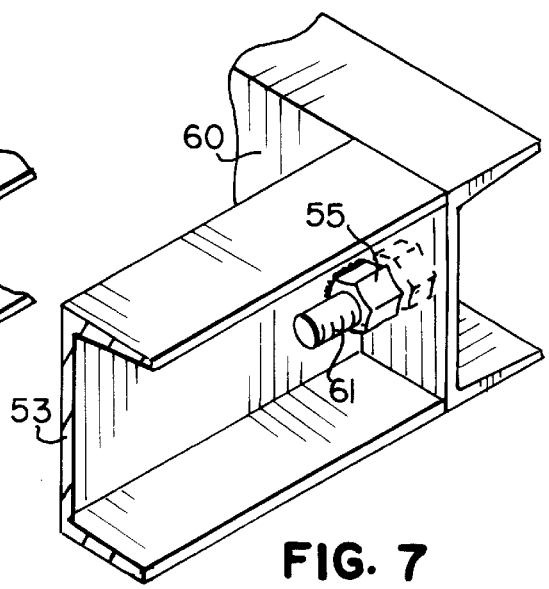
FIG. 7 is an enlarged, fragmentary, perspective view in partial section of another portion of the retaining frame of the cart of FIG. 1.

The cart 20 also includes a retaining frame 50 for maintaining the cylinders 11 in a spaced configuration in the array 10. Referring in particular to FIGS. 1 and 2, the retaining frame 50 includes a pair of generally H-shaped frames 51, adapted to be respectively disposed on opposite sides of the mast 40, and each including an elongated bar 52 and an elongated channel 53 interconnected midway between the ends thereof by a cross member 54, which may be in the form of a box beam. Referring also to FIG. 7, each of the channels 53 has affixed to the center wall thereof, as by welding, at each end thereof, a nut 55 arranged with its axis parallel to the longitudinal axis of the channel 53. Each of the bars 52 has a longitudinal slot 56 formed in each end thereof. A nut 57 is fixed, as by welding, in the open end of each slot 56 coaxially with the bar 52 (see FIG. 6).

Each H-shaped frame 51 is secured to an associated one of the mast posts 41 by a pair of U-bolts 58, which extend through complementary openings in the bars 52, being secured in placed by associated nuts (not shown). The open ends of the H-shaped frames 51 are closed by end channels 60, each having formed through the central wall thereof a plurality of longitudinally spaced openings for respectively receiving bolts 61, which are respectively threadedly engaged with the nuts 55 and 57, as best illustrated in FIGS. 2, 6 and 7.

Thus, it will be appreciated that the retaining frame 50 cooperates with the mast 40 to define an arrangement of six elongated cells, three forward of the mast 40 and three aft thereof, and each accommodating two cylinders 11, as can best be seen in FIG. 1. Thus, the bars 52 of the retaining frame 50 serve to separate adjacent pairs of cylinders from each other in the array 10. By reason of the bolted assembly to the mast 40, the retaining frame 50 can be positioned at any desired height along the mast 40. Further, the bolted assembly of the end channels 60 to the H-shaped frames 51 facilitates insertion of the cylinders 11 into the cells defined by the retaining frame 50.

There may also be provided a manifold support angle 63, which is preferably in the nature of an angle member having a horizontal flange 64 supporting a pair of longitudinally spaced clamps 65, and a vertical flange 66 which may be secured, as by a pair of U-bolts 67 (FIG. 2), to one of the mast posts 41. This bolted mounting permits easy adjustment of the height of the manifold support angle 63 which, in a known manner, can support a manifold extending among several cylinders 11 in the array 10. While one manifold support angle 63 is illustrated, it will be appreciated that another could be provided on the other mast post, if desired.

Figure 5:
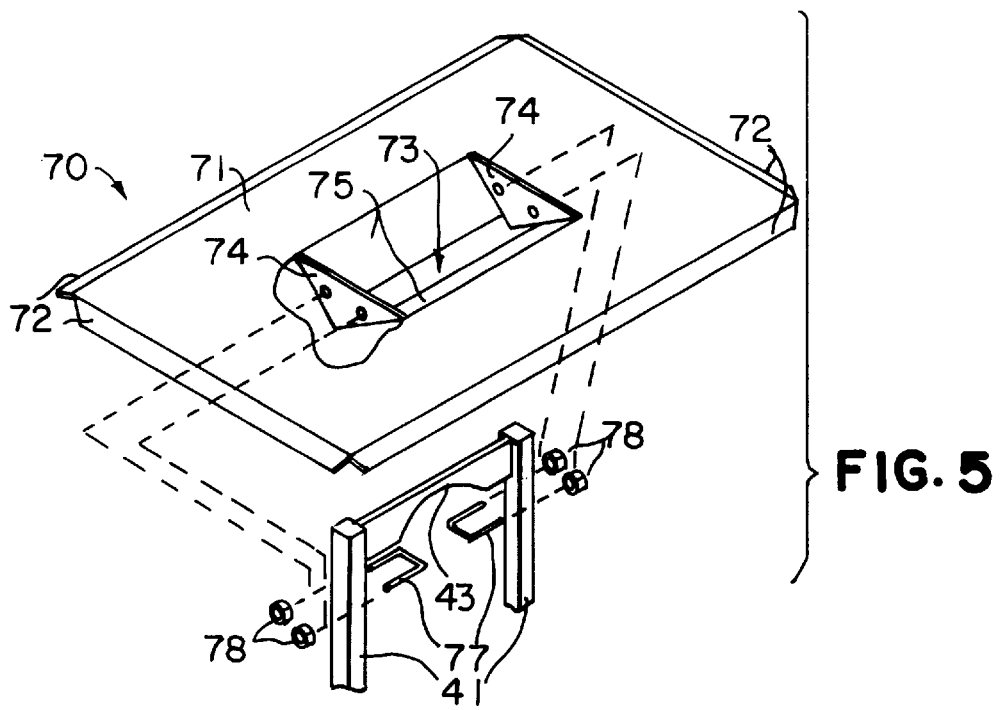
FIG. 5 is a fragmentary, exploded, perspective view of the mast and cover of the cart of FIG. 1.

Preferably, the cart 20 also includes a cover 70, which includes a substantially flat, horizontal plate 71 provided at its peripheral edges with down-turned flanges 72. The plate 71 has a generally rectangular central aperture 73 therethrough, defined by a pair of vertically depending side flanges 74, each substantially trapezoidal in shape, and a pair of downwardly and inwardly sloping end flanges 75. The lower edges of the flanges 74 and 75 meet to define the aperture 73, which is dimensioned to receive therethrough the upper end of the mast 40, being secured thereto by U-bolts 77 (see FIG. 5) extending through complementary openings in the side flanges 74 and secured to associated nuts 78. Thus, it will be appreciated that the cover 70 can easily be mounted in any desired position, typically just above the upper ends of the cylinders 11.

Figure 8:
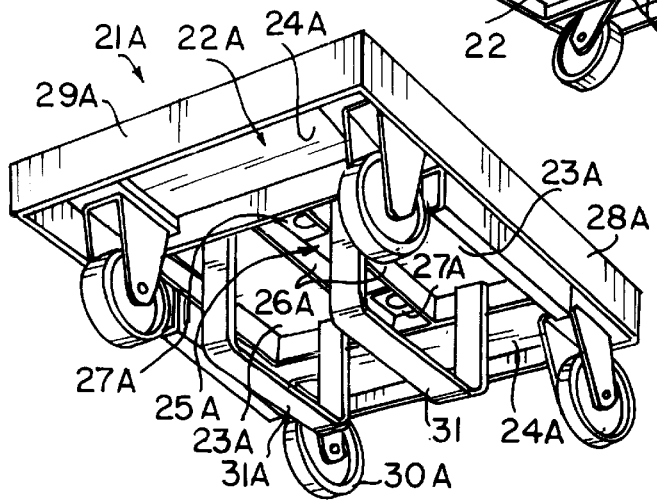
FIG. 8 is a bottom perspective view of an alternative form of base for the cart of FIG. 1.

Referring to FIG. 8 there is illustrated an alternative form 21A of the base 21, which is also rectangular in shape, but smaller in size, being dimensioned to accommodate six of the cylinders 11. The base 21A has a base wall or platform 22A made of a plurality of channel members, including a pair of end channels 24A interconnected by a pair of laterally-spaced side channels 23A, the depending inner flanges 26A of which cooperate to define a central aperture 25A which is dimensioned to receive the mast 40 and extends longitudinally of the base 21. Washers 27A are fixed in the opposite ends of the aperture 25A for attachment to the mast 40 in the manner described above. Also, side walls 28A and end walls 29A are provided in the same manner described above. The base 21A is provided with a pair of depending, generally U-shaped skid rails 31A which, in this case, depend from the undersides of the side channels 23A inboard of the base 21. Side partitions (not shown) like the partitions 32, may project upwardly from the platform 22A and extend longitudinally of the platform 22A for cooperation with the mast 40 and the walls 28A and 29A to divide the platform 22A into a pair of laterally spaced sections. The base 21A is also provided with a pair of depending skirts 33A, which may be in the form of box beams and depend at the lateral outer edges of the base 21A between the front and rear sets of casters 30A. In this case, the array of cylinders supported on the cart 20A includes two rows of three cylinders, respectively on opposite sides of the mast 40.

It will be appreciated that the bolted construction of the cart 20 permits easy adjustment of the location of portions of the cart along the mast 40 and also permits easy assembly and disassembly to facilitate transport and storage of the cart 20. While specific sizes and shapes of the cart 20 are illustrated, it will be appreciated that other sizes and shapes could be provided to accommodate different arrays of cylinders.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A knock-down support for a plurality of pressurized gas cylinders comprising:

a base having a platform with top and bottom sides and an aperture therethrough centrally thereof, an elongated mast having an upper end receivable through the aperture from the bottom side of said platform and a lower end, and coupling structure fixed to the lower end of the mast and dimensioned to prevent passage through the aperture and removably secured to the base.

2. The support of claim 1, wherein said mast includes a pair of parallel, spaced-apart, upstanding posts.

3. The support of claim 2, wherein said base is substantially rectangular in shape, having a longitudinal extent and a lateral extent, said aperture extending laterally of said base.

4. The support of claim 2, wherein said base is substantially rectangular in shape, having a longitudinal extent and a lateral extent, said aperture extending longitudinally of said base.

5. The support of claim 1, wherein said coupling structure is bolted to the base.

6. The support of claim 1, wherein said support is in the form of a cart, and further comprising a plurality of casters depending from said base.

7. The support of claim 1, wherein said base includes divider walls integral with said platform and projecting upwardly therefrom for cooperation with said mast to define separated support areas on said base.

8. A knock-down support for a plurality of pressurized gas cylinders comprising:

a base having a platform with an aperture therethrough centrally thereof, an elongated mast received through the aperture and removably secured to the base and projecting upwardly therefrom, and a retaining frame removably secured to the mast above the base and extending substantially parallel to the base, said retaining frame forming a grid defining a plurality of spaced cylinder cells, whereby cylinders may be supported on the base and respectively disposed in said cells for retaining the cylinders on the support and maintaining spacing therebetween.

9. The support of claim 8, wherein said retaining frame is bolted to said mast with U-bolts and associated nuts.

10. The support of claim 8, wherein said mast includes a pair of parallel, spaced-apart, upstanding posts.

11. The support of claim 8, wherein said retaining frame includes two portions respectively removably secured to said posts.

12. The support of claim 11, wherein each of said portions is in the form of a H-frame secured to an associated one of the posts by U-bolts.

13. The support of claim 8, wherein said retaining frame includes a plurality of laterally spaced cross members, and a pair of end members bolted to said cross members for interconnecting them respectively at the opposite ends thereof.

14. The support of claim 13, wherein each of said cross members has a nut fixed thereto, and further comprising a plurality of bolts respectively extending through openings in said end members and threadedly engaged with said nuts.

15. The support of claim 14, wherein two of said cross members are in the form of elongated channels, each having a center web and side flanges, said nuts being secured to said center webs.

16. The support of claim 15, wherein two of said cross members have longitudinal slots provided in the opposite ends thereof, said nuts being disposed in said slots coaxially with said cross members.

17. A knock-down support for a plurality of pressurized gas cylinders comprising:

a base having a platform with an aperture therethrough centrally thereof, an elongated mast received through the aperture and removably secured to the base and projecting upwardly therefrom, a retaining frame removably secured to the mast above the base and extending substantially parallel to the base, and a cover structure removably secured to the mast above the retaining frame, whereby cylinders may be supported on the base beneath the cover and respectively disposed in said cells for retaining the cylinders on the support and maintaining spacing therebetween.

18. The support of claim 17, wherein said cover has an aperture formed centrally therethrough and receiving said mast therethrough.

19. The support of claim 18, wherein said cover includes a pair of attachment walls respectively depending on opposite sides of said aperture and respectively bolted to said mast.

20. The support of claim 19, wherein said cover further includes a pair of sloping depending walls at opposite ends of said aperture and cooperating with said side walls to define said aperture.

21. The support of claim 17, wherein said support is in the form of a cart, and further comprising a plurality of casters depending from said base.

22. The support of claim 17, and further comprising a manifold support removably attached to said mast between said cover and said retaining frame for supporting an associated manifold for the gas cylinders.

23. The support of claim 17, wherein said base platform has top and bottom sides, said mast having an upper end receivable through the aperture from the bottom side of said platform and an upper end, and coupling structure fixed to the lower end of the mast and dimensioned to prevent passage through the aperture and removably secured to the base.

* * * * *